United States Patent
Bin et al.

(10) Patent No.: US 12,032,718 B1
(45) Date of Patent: Jul. 9, 2024

(54) SYSTEM, METHOD, AND COMPUTER PROGRAM FOR SECURELY HANDLING AND STORING CUSTOMER DATA WITHOUT ENABLING HUMAN ACCESS TO THE DATA

(71) Applicant: Odaseva Technologies SAS, Neuilly-sur-Seine (FR)

(72) Inventors: Sovane Bin, San Francisco, CA (US); Saddek Dekoum, Ris Orangis (FR); Raphaël Fonrouge, Chatenay Malabry (FR); Francois Lopitaux, San Carlos, CA (US)

(73) Assignee: Odaseva Technologies SAS, Neuilly-sur-Seine (FR)

( * ) Notice: Subject to any disclaimer, the term of this patent is extended or adjusted under 35 U.S.C. 154(b) by 74 days.

(21) Appl. No.: 17/156,409

(22) Filed: Jan. 22, 2021

(51) Int. Cl.
  *G06F 21/62* (2013.01)
  *G06F 11/14* (2006.01)
  *G06F 21/60* (2013.01)
  *H04L 9/08* (2006.01)

(52) U.S. Cl.
  CPC ...... *G06F 21/6245* (2013.01); *G06F 11/1464* (2013.01); *G06F 11/1469* (2013.01); *G06F 21/602* (2013.01); *H04L 9/0819* (2013.01); *G06F 2201/805* (2013.01)

(58) Field of Classification Search
  None
  See application file for complete search history.

(56) References Cited

U.S. PATENT DOCUMENTS

| | | | |
|---|---|---|---|
| 9,268,587 B2 | 2/2016 | Kruglick | |
| 9,769,131 B1 * | 9/2017 | Hartley | H04W 12/033 |
| 11,055,123 B1 | 7/2021 | Bin et al. | |
| 11,609,774 B2 | 3/2023 | Bin et al. | |
| 2008/0049942 A1 * | 2/2008 | Sprunk | H04L 9/006 380/283 |
| 2012/0117558 A1 * | 5/2012 | Futty | G06F 9/44505 717/176 |
| 2012/0324242 A1 * | 12/2012 | Kirsch | G06F 21/6245 713/189 |

(Continued)

FOREIGN PATENT DOCUMENTS

WO    WO-2022081408 A1 *  4/2022

*Primary Examiner* — Meng Li
*Assistant Examiner* — Felicia Farrow
(74) *Attorney, Agent, or Firm* — Lessani Law Group, PC

(57) ABSTRACT

A system for securely handling and storing customer data without enabling human access to the data receives and processes the customer data for storage where the customer data is granularly encrypting without storing a key for decryption. The granularly-encrypted customer data is transmitted over a secure network to a cloud-based data storage system that has no access to the key for decryption. The system receives a request from the customer to transmit the customer data to an external destination. The system retrieves the granularly-encrypted customer data from the cloud-based data storage system over a secure network and receives the key for decryption from the customer. The system decrypts the granularly-encrypted customer data using the key and discards the key. The system processes the customer data for transmission and transmits the customer data to the external destination over a secure network.

19 Claims, 10 Drawing Sheets

(56) References Cited

U.S. PATENT DOCUMENTS

| | | | |
|---|---|---|---|
| 2013/0283060 A1* | 10/2013 | Kulkarni | H04L 63/061 |
| | | | 713/189 |
| 2013/0297769 A1 | 11/2013 | Chang et al. | |
| 2014/0101438 A1* | 4/2014 | Elovici | G06F 21/602 |
| | | | 713/165 |
| 2014/0278534 A1* | 9/2014 | Romeo | G16H 10/60 |
| | | | 705/3 |
| 2016/0147999 A1* | 5/2016 | Fontanetta | G06Q 20/14 |
| | | | 705/30 |
| 2016/0308855 A1* | 10/2016 | Lacey | H04L 63/061 |
| 2017/0025040 A1 | 1/2017 | Maturana et al. | |
| 2017/0048252 A1 | 2/2017 | Straub et al. | |
| 2018/0176117 A1 | 6/2018 | Gudetee et al. | |
| 2019/0007206 A1* | 1/2019 | Surla | H04L 63/10 |
| 2020/0067772 A1 | 2/2020 | Tomkins et al. | |
| 2020/0082890 A1 | 3/2020 | Karr et al. | |
| 2020/0127937 A1 | 4/2020 | Busick et al. | |
| 2021/0049029 A1 | 2/2021 | Kumble et al. | |
| 2021/0067324 A1* | 3/2021 | Valente | G06F 21/602 |
| 2022/0107826 A1 | 4/2022 | Bin et al. | |

\* cited by examiner

SYSTEM, METHOD, AND COMPUTER PROGRAM FOR SECURELY HANDLING AND STORING CUSTOMER DATA WITHOUT ENABLING HUMAN ACCESS TO THE DATA

BACKGROUND OF THE INVENTION

1. Field of the Invention

This invention relates generally to data encryption and, more specifically, to a system and method for securely handling and storing customer data without enabling human access to the data.

2. Description of the Background Art

Data encryption is a method of securing information by encoding it such that it can only be accessed by a user with the correct encryption/decryption key. The information would be unreadable to anyone without the correct key. While, in theory, this may seem to provide adequate protection, in practicality, known data encryption methods are not necessarily secure. For example, in known systems and methods, unencrypted data is transmitted by a customer to a backup system for processing and to a data storage system for storage. The unencrypted data is encrypted at the data storage system with a key stored by the data storage system. There are inherent risks to the known systems and methods, because employees of the backup system have access to the data (as the data is only encrypted at the disk or operating system level, a login/password is enough to view the data) and employees of the data storage system also have access to the data (as the key is stored by the data storage system). If a hacker obtains an employee's login credentials, the hacker can steal the data. Therefore, there is a need for a system and method that is designed to have no human access such that even if a hacker were to obtain login credentials of any backup system employee or data storage employee, the hacker still would not be able to steal any data.

SUMMARY OF THE DISCLOSURE

The present disclosure describes a system, method, and computer program for securely handling and storing customer data without enabling human access to the data. The method is performed by a computer system that granularly encrypts, decrypts, and processes customer data.

The server receives customer data from an external customer application, which it then processes for storage and granularly encrypts without storing a key for decrypting the customer data. The granularly-encrypted customer data is transmitted and stored in a cloud-based data storage system that also does not store the key for decrypting the customer data. When a customer requests that the customer data be transmitted to an external destination, the server retrieves the granularly-encrypted customer data from the cloud-based data storage system and receives the key for decrypting the granularly-encrypted customer data from the customer or a customer-controlled key management system. The server decrypts the granularly-encrypted customer data using the key, processes the customer data for transmission, and transmits the customer data to the external destination. The processing, granular encryption, and decryption take place in an encrypted environment and the granularly-encrypted customer data is stored in an encrypted storage for added layers of protection.

In certain embodiments, the server requests from the customer or a customer-controlled key management system the same key for encryption and decryption. In certain embodiments, the customer data is encrypted with a public key, but decrypted with a private key. In certain embodiments, the granularly-encrypted customer data is transmitted to an external destination without first decrypting it. The methods of the claimed invention may be applied to many scenarios such as backup and restore, archiving, providing a cloud emulator, storage (e.g., providing an alternate storage system), and/or data migration between environments. In certain embodiments, such as when the method is applied to backup and archiving, the system may also retrieve and granularly encrypt customer metadata in addition to customer data.

In one embodiment, a method for securely handling and storing customer data without enabling human access to the data comprises the following steps:
  receiving customer data;
  processing the customer data for storage, wherein the processing is performed in memory and in an encrypted environment;
  granularly encrypting the customer data without storing a key to decrypt the customer data, wherein the encryption is performed in memory and in the encrypted environment to provide a plurality of encryption layers for the customer data;
  transmitting the granularly-encrypted customer data over a secure network to a cloud-based data storage system, wherein the granularly-encrypted customer data is stored in an encrypted database or file system to provide a plurality of encryption layers for the customer data and wherein the cloud-based data storage system has no access to the key for decrypting the granularly-encrypted customer data;
  receiving a request from the customer to transmit the customer data to an external destination;
  retrieving the granularly-encrypted customer data from the cloud-based data storage system over a secure network;
  receiving the key for decrypting the granularly-encrypted customer data from the customer or a customer-controlled key management system;
  decrypting the granularly-encrypted customer data using the key, wherein the key is used in memory only and wherein the decryption is performed in the encrypted environment;
  discarding the key;
  processing the customer data for transmission, wherein the processing is performed in memory; and
  transmitting the customer data to the external destination over a secure network.

DETAILED DESCRIPTION OF THE PREFERRED EMBODIMENTS

The present disclosure describes a system, method, and computer program for securely handling and storing customer data without enabling human access to the data. The method is performed by a computer system that granularly encrypts, decrypts, and processes customer data ("the system").

The server receives customer data from an external customer application, which it then processes for storage and granularly encrypts without storing a key for decrypting the customer data. The granularly-encrypted customer data is transmitted and stored in a cloud-based data storage system that also does not store the key for decrypting the customer data. When a customer requests that the customer data be transmitted to an external destination, the server retrieves the granularly-encrypted customer data from the cloud-based data storage system and receives the key for decrypting the granularly-encrypted customer data from the customer or a customer-controlled key management system. The server decrypts the granularly-encrypted customer data using the key, processes the customer data for transmission, and transmits the customer data to the external destination. The processing, granular encryption, and decryption take place in an encrypted environment and the granularly-encrypted customer data is stored in an encrypted storage for added layers of protection.

Example implementations of the method are described in more detail with respect to FIGS. 1A-5.

Figure 1A:
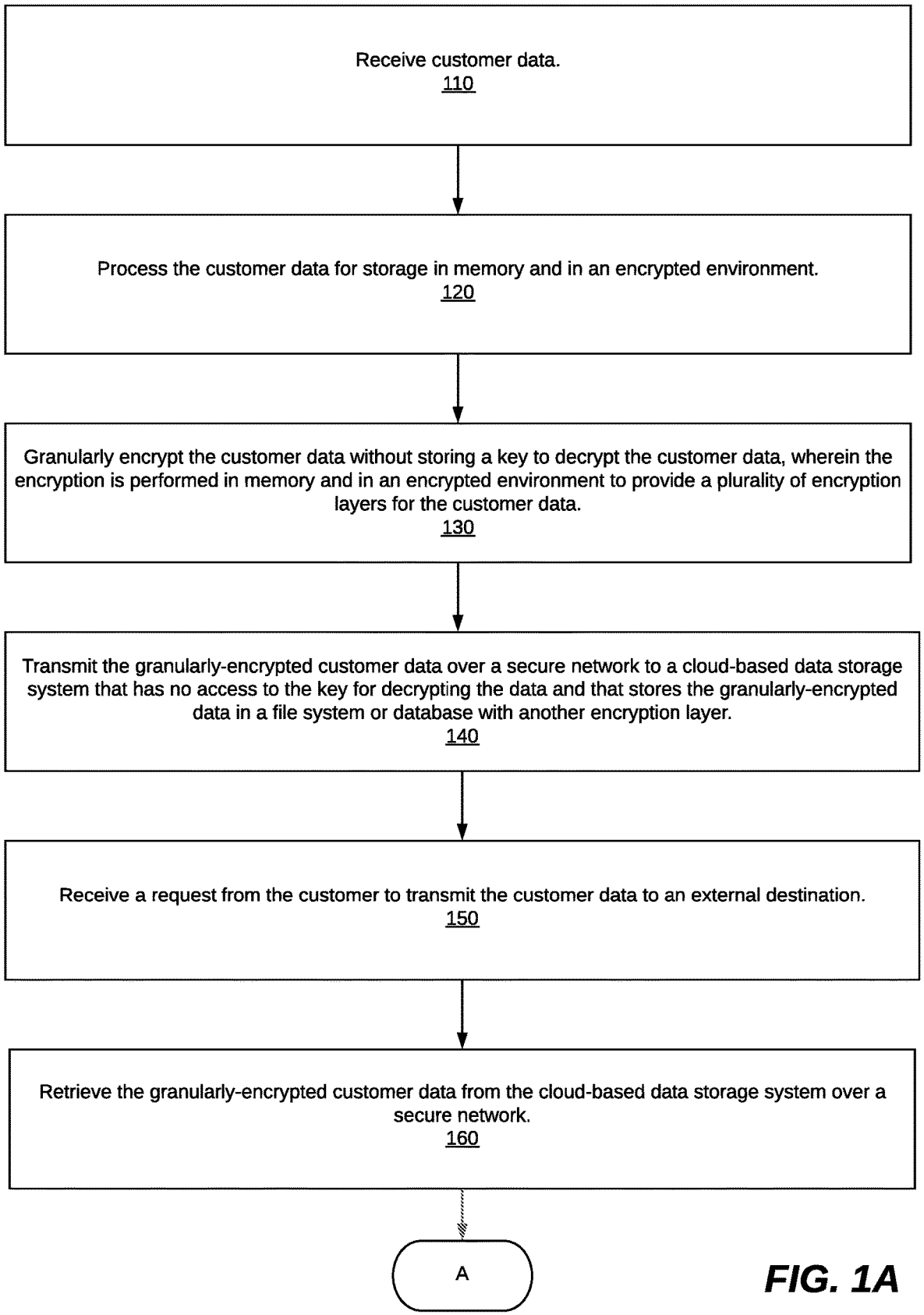
FIGS. 1A-1B are flowcharts that illustrate a method, according to one embodiment, for securely handling and storing customer data without enabling human access to the data.
Figure 1B:
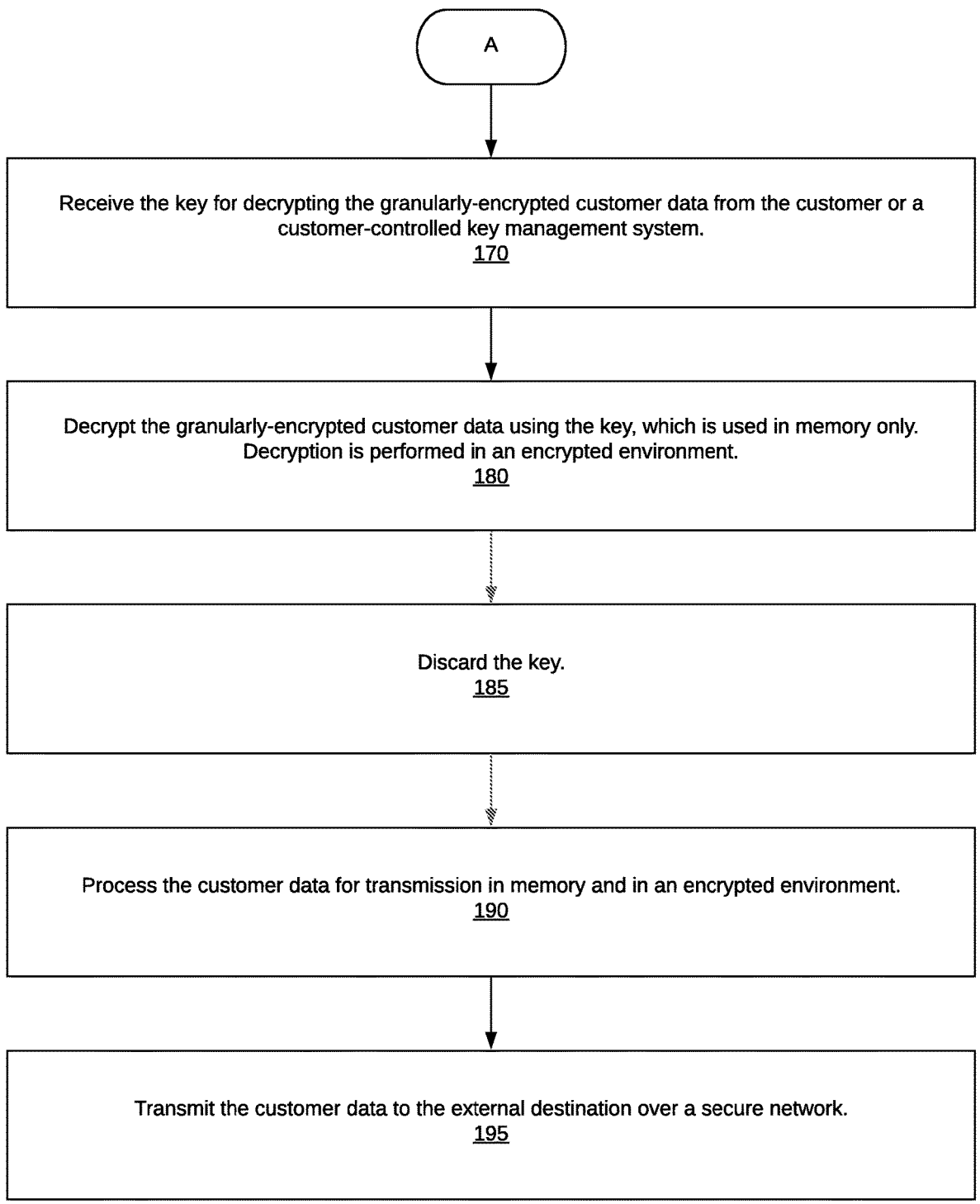

1. Method for Securely Handling and Storing Customer Data without Enabling Human Access to the Data FIGS. 1A-1B illustrate a method for securely handling and storing customer data without enabling human access to the data. The system receives the customer data (step 110). In certain embodiments, it extracts the customer data from an external customer application (e.g., SALESFORCE, MICROSOFT, GOOGLE, etc.) over a secure network using an application programming interface (API). The system processes the customer data for storage, where the processing is performed in memory and in an encrypted environment (step 120).

1.1 Granularly Encrypting the Customer Data without Storing a Key

The system granularly encrypts the customer data without storing a key to decrypt the customer data (step 130). The encryption is performed in memory and in the encrypted environment to provide a plurality of encryption layers for the customer data. The granularly-encrypted customer data is transmitted over a secure network to a cloud-based data storage system (step 140). The granularly-encrypted customer data is stored in an encrypted database or file system to provide a plurality of encryption layers for the customer data. The cloud-based data storage system has no access to the key for decrypting the granularly-encrypted customer data.

1.2 Receiving a Request from the Customer to Transmit the Customer Data to an External Destination The system receives a request from the customer to transmit the customer data to an external destination (step 150). It retrieves the granularly-encrypted customer data from the cloud-based data storage system over a secure network (step 160). It receives the key for decrypting the granularly-encrypted customer data from the customer or a customer-controlled key management system (step 170). The system then decrypts the granularly-encrypted customer data using the key, which is used in memory only (step 180). Decryption is performed in an encrypted environment. The system discards the key (step 185). The system processes the customer data for transmission, where the processing is performed in memory and in an encrypted environment (step 190). It then transmits the customer data to the external destination over a secure network (step 195).

1.3 Additional Embodiments

In certain embodiments, granularly encrypting the customer data includes requesting a key for performing granular encryption from a customer-controlled key management system. The system receives the key from the customer-controlled key management system. It granularly encrypts the customer data using the key, where the key is used by the system in memory only. The key is then discarded after granularly encrypting the customer data. In certain embodiments, decrypting the customer data includes requesting the key again from the customer-controlled key management system.

In certain embodiments, the customer data is encrypted with a public key and decrypted with a private key provided by the customer in response to the customer requesting the customer data be transmitted to the external destination, where the private key is used in memory only for decryption and discarded after decryption.

In certain embodiments, receiving the customer data includes extracting the customer data from an external customer application over a secure network. The customer data is extracted for the purpose of providing a backup for the customer data in the external customer application. Processing the customer data for storage includes processing the customer data for backup. The customer data is retrieved from the cloud-based data storage system, decrypted, and transmitted to the external customer application in response to receiving a restore request from the customer.

In certain embodiments, the customer data is extracted for the purpose of archiving the customer data in the external customer application and processing the customer data for storage comprises processing the customer data for archiving. In certain embodiments, the customer data is extracted for the purpose of providing a cloud emulator of the customer data. In certain embodiments, the customer data is extracted for the purpose of providing an alternate storage system.

In certain embodiments, the granularly-encrypted customer data is retrieved from the cloud-based data storage system and transmitted to the external destination over a secure network without first decrypting the granularly-encrypted customer data.

2. Example System Architecture

Figure 2:
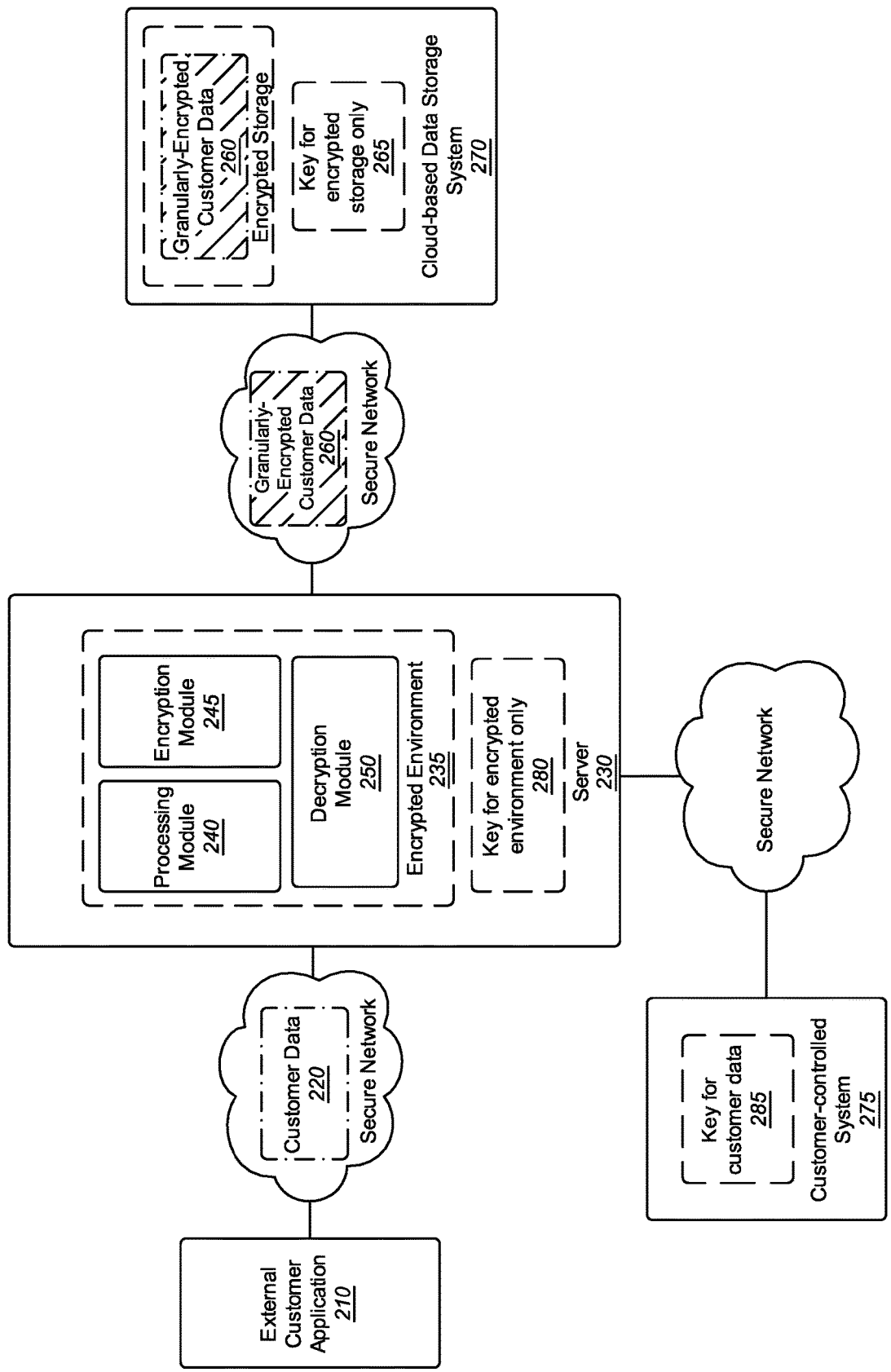
FIG. 2 is a block diagram that illustrates an example software architecture according to one embodiment.

FIG. 2 illustrates an example architecture for a system that performs the methods described herein. However, the methods described herein may be implemented in other systems and are not limited to the illustrated system.

The system includes an external customer application 210 that transmits customer data 220 by means of a secure network to a server 230 having an encrypted environment 235. The server 230 includes a processing module 240 that processes the customer data for storage as well as processes the decrypted customer data for transmission. The server 230 also includes an encryption module 245 that granularly encrypts customer data and a decryption module 250 that decrypts the customer data by means of a customer-provided key. Processing, granularly encrypting, and decrypting the customer data all take place within the encrypted environment 235. The server 230 has access to the key for the encrypted environment 280, but it does not have access to the key for customer data 285.

After the encryption module 245 granularly encrypts the customer data 220, the server 230 transmits the granularly-encrypted customer data 260 over a secure network to an encrypted storage of a cloud-based data storage system 270. The cloud-based data storage system 270 has access to the key for the encrypted storage 265, but it does not have access to the key for customer data 285. The data storage system may be part of the same system as the server that processes, encrypts, and decrypts the data or it may be in an external system.

When the server 230 receives a request from a customer to transmit the customer data to an external destination, the server 230 retrieves the granularly-encrypted customer data 260 from the cloud-based data storage system 270 over a secure network. It receives the key 285 for decrypting the granularly-encrypted customer data 260 from the customer or a customer-controlled key management system 275, which neither the server 230 nor the cloud-based data storage system 270 has access to. The decryption module 250 decrypts the granularly-encrypted customer data 260 using the key 285, which it then discards. After the processing module 240 processes the customer data for transmission, the server 230 transmits the customer data to the external destination over a secure network.

3. Method for Performing a Backup and Restore with a Symmetric Key

Figure 3A:
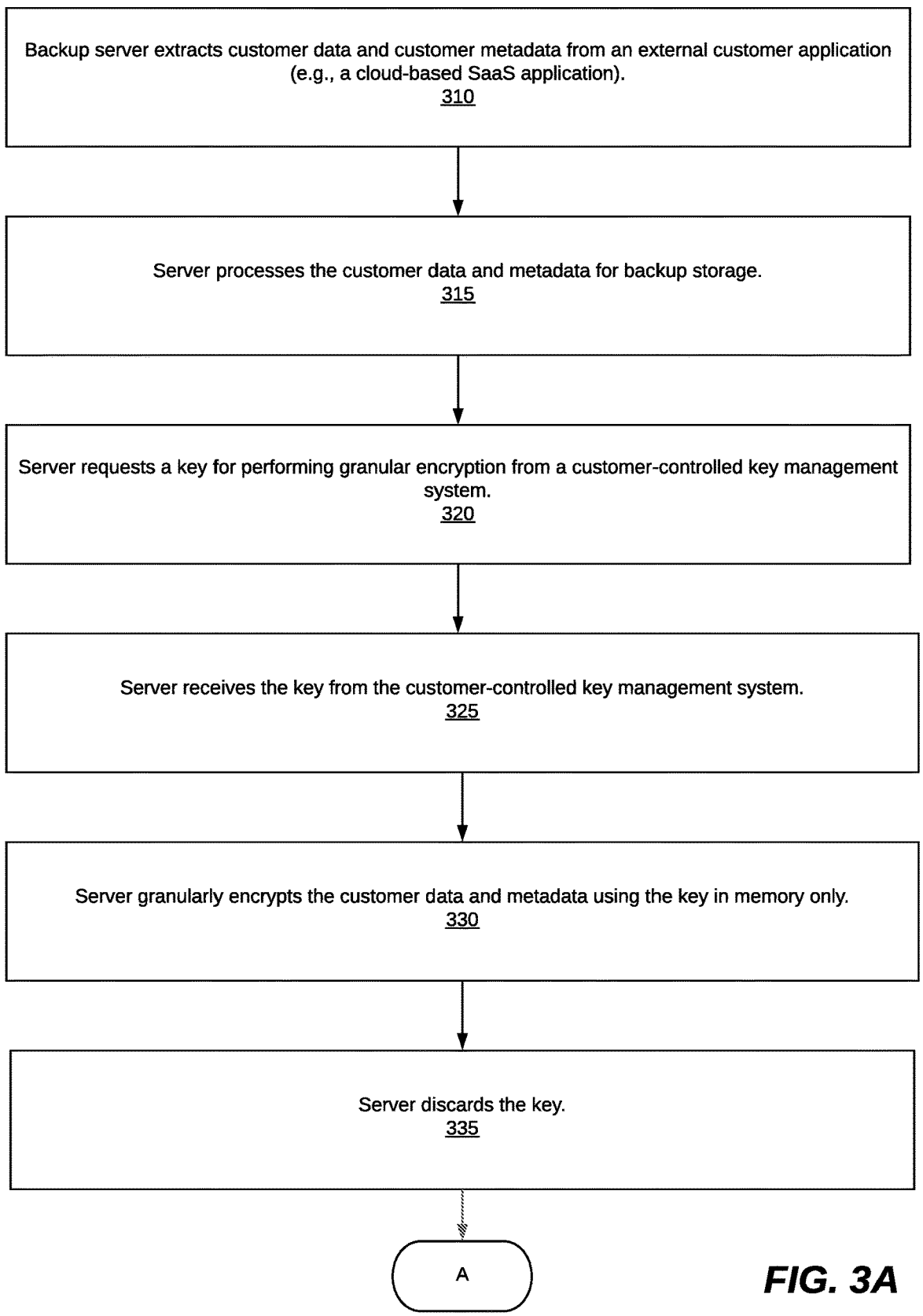
FIGS. 3A-3C are flowcharts that illustrate a method, according to one embodiment, for performing a backup and restore with a symmetric key.
Figure 3B:
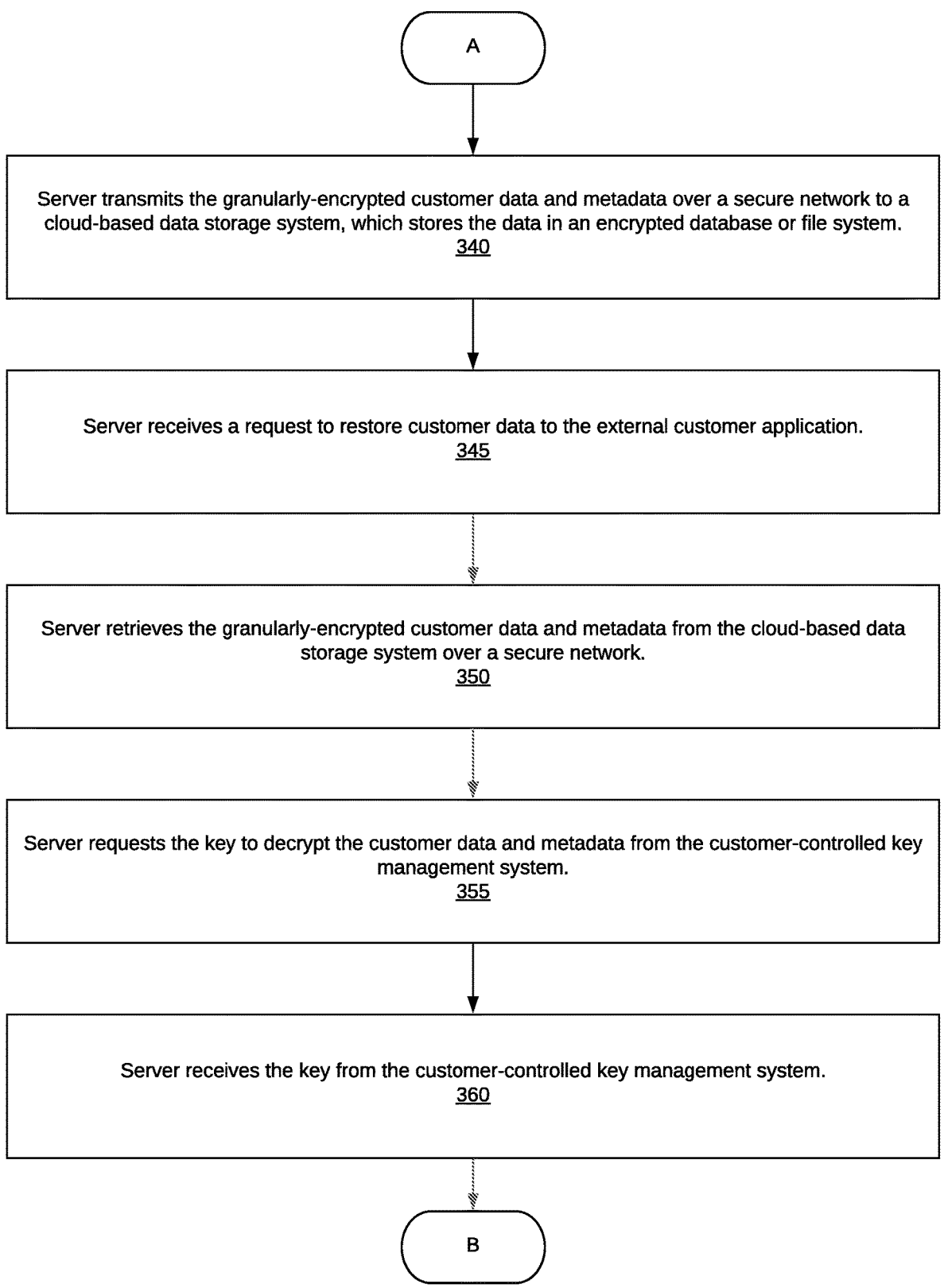
Figure 3C:
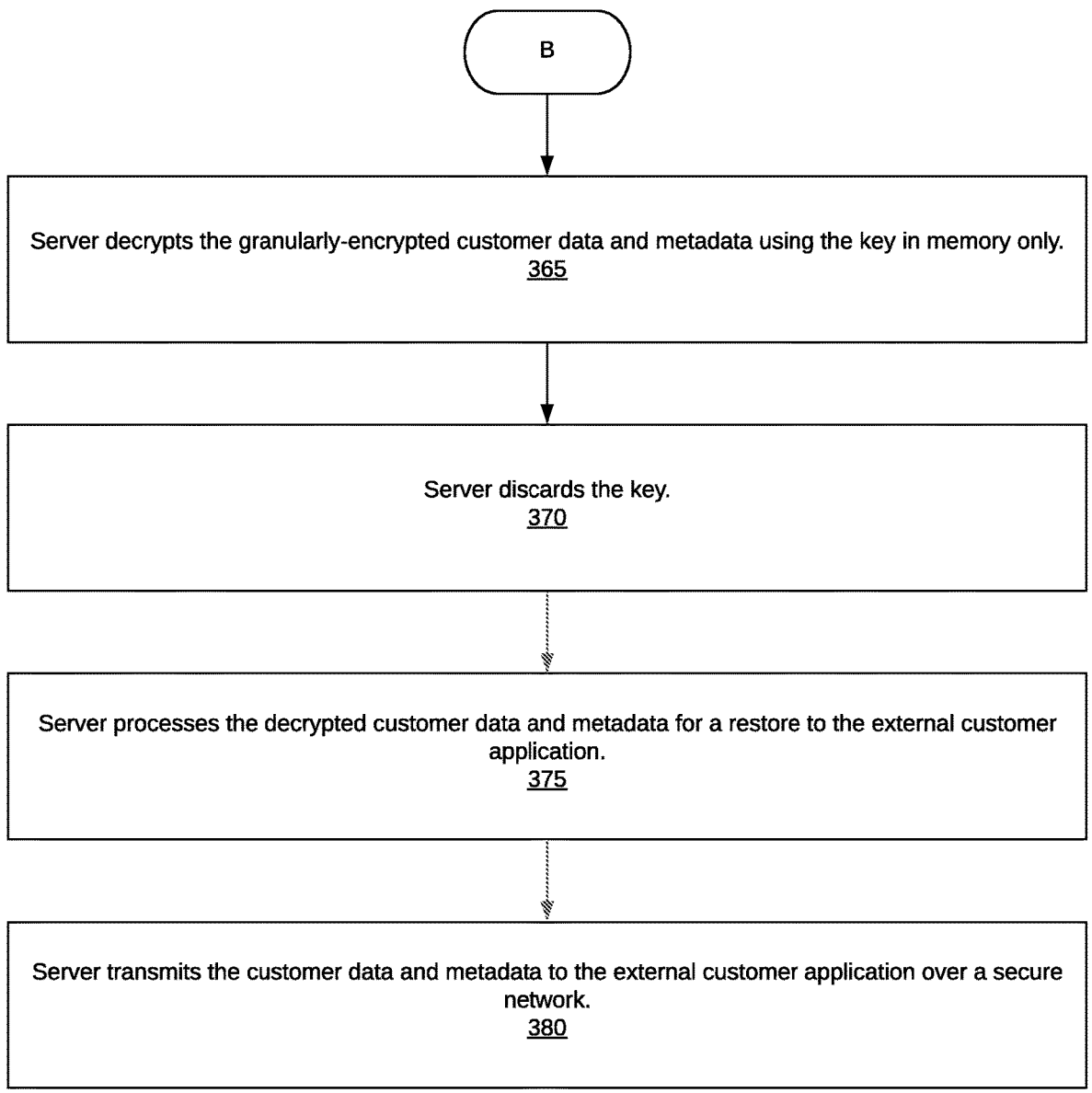

FIGS. 3A-3C illustrate a method for performing a backup and restore with a symmetric key. The backup server extracts customer data and customer metadata from an external customer application (e.g., a cloud-based SaaS application) (step 310). The server processes the customer data and metadata for backup storage (step 315). The server requests a key for performing granular encryption from a customer-controlled key management system (step 320). It then receives the key from the customer-controlled key management system (step 325). The server granularly encrypts the customer data and metadata using the key in memory only (step 330). The server discards the key (step 335).

The server transmits the granularly-encrypted customer data and metadata over a secure network to a cloud-based data storage system, which stores the customer data and metadata in an encrypted database or file system (step 340). The server receives a request to restore customer data to the external customer application (step 345). The server retrieves the granularly-encrypted customer data and metadata from the cloud-based data storage system over a secure network (step 350). The server requests the key to decrypt the customer data and metadata from the customer-controlled key management system (step 355). The server receives the key from the customer-controlled key management system (step 360). The server decrypts the granularly-encrypted customer data and metadata using the key in memory only (step 365). The server discards the key (step 370). The server processes the decrypted customer data and metadata for a restore to the external customer application (step 375). The server transmits the customer data and metadata to the external customer application over a secure network (step 380).

4. Method for Performing a Backup and Restore with Public and Private Keys

Figure 4A:
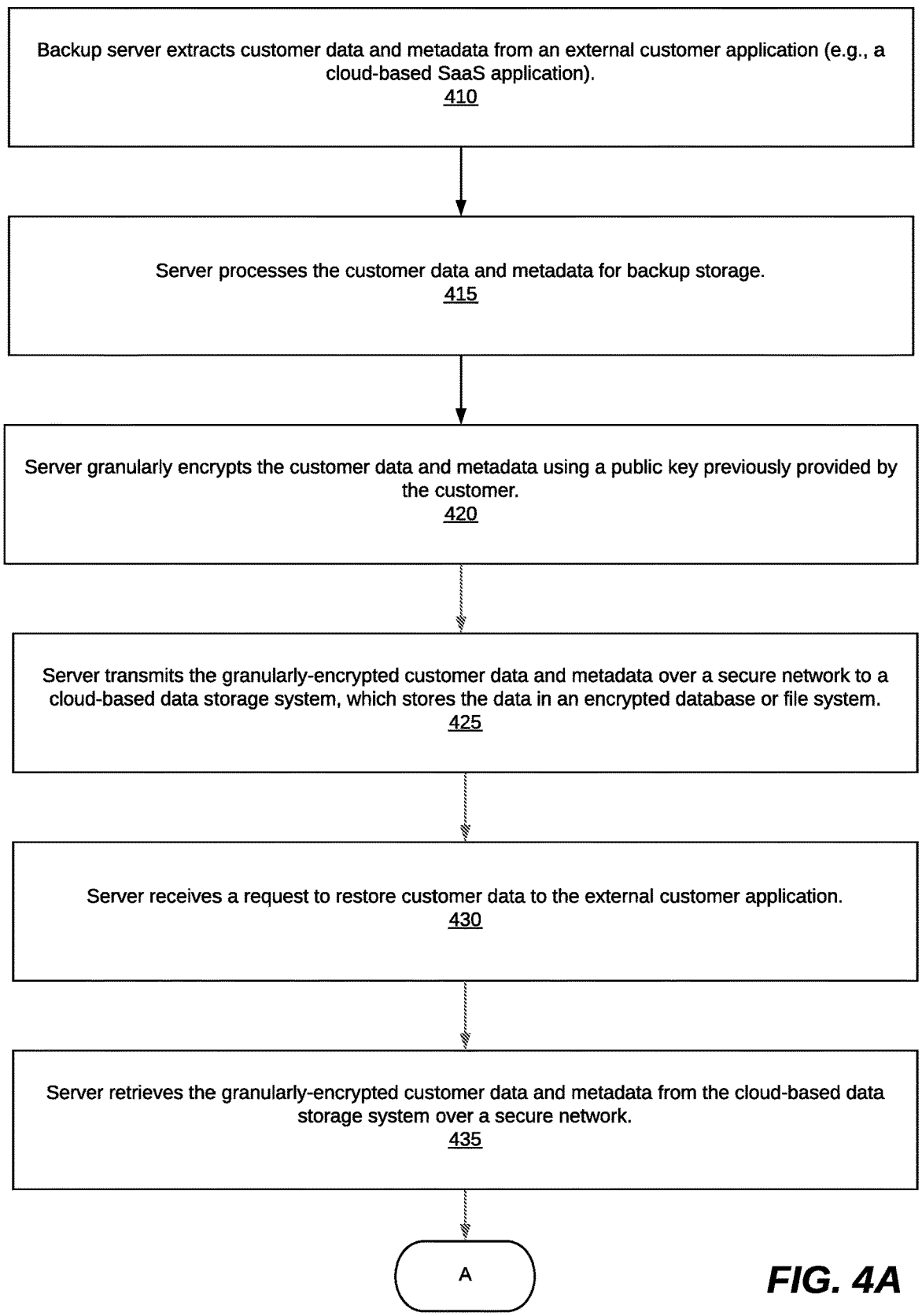
FIGS. 4A-4C are flowcharts that illustrate a method, according to one embodiment, for performing a backup and restore with public and private keys.
Figure 4B:
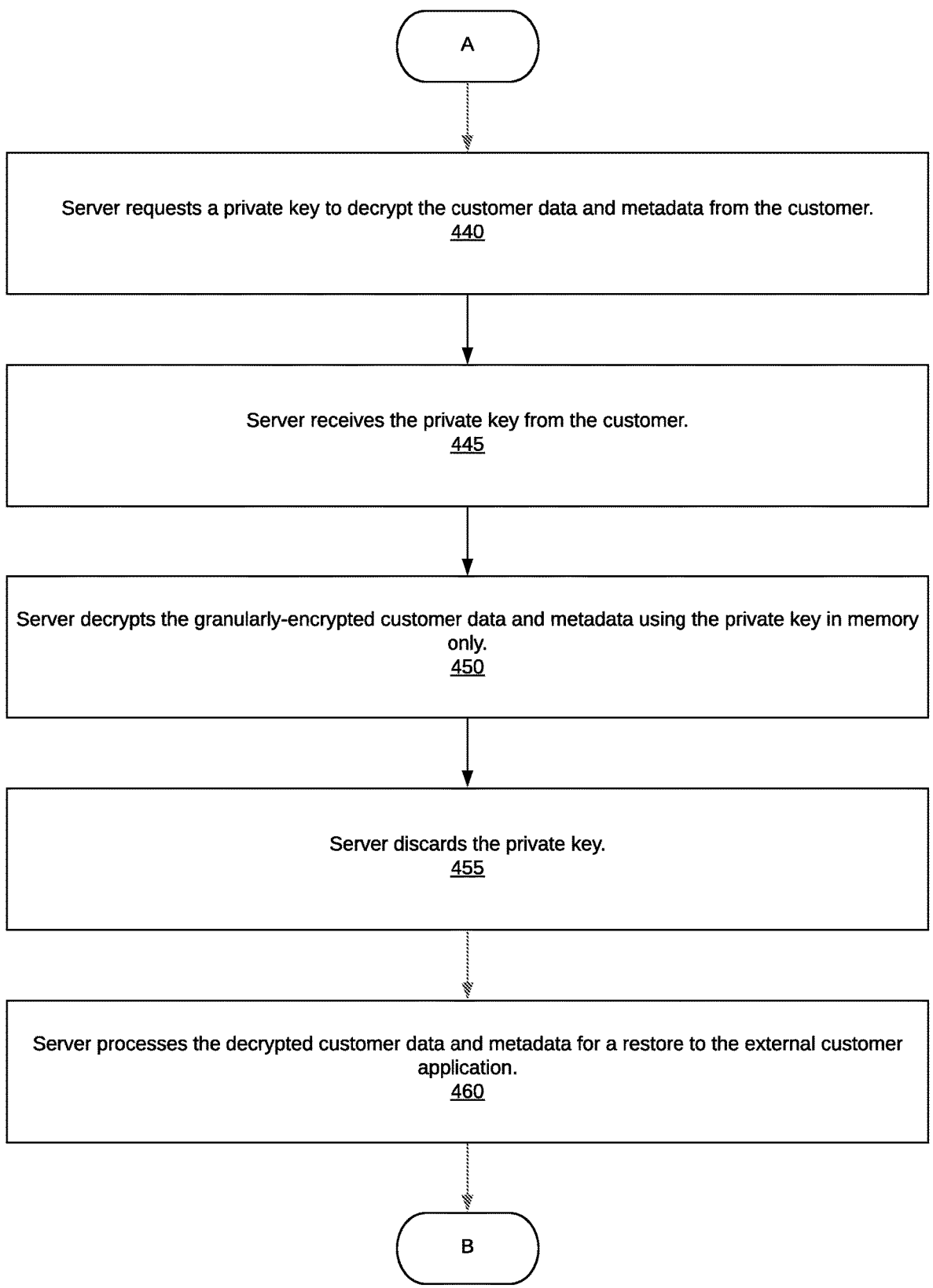
Figure 4C:
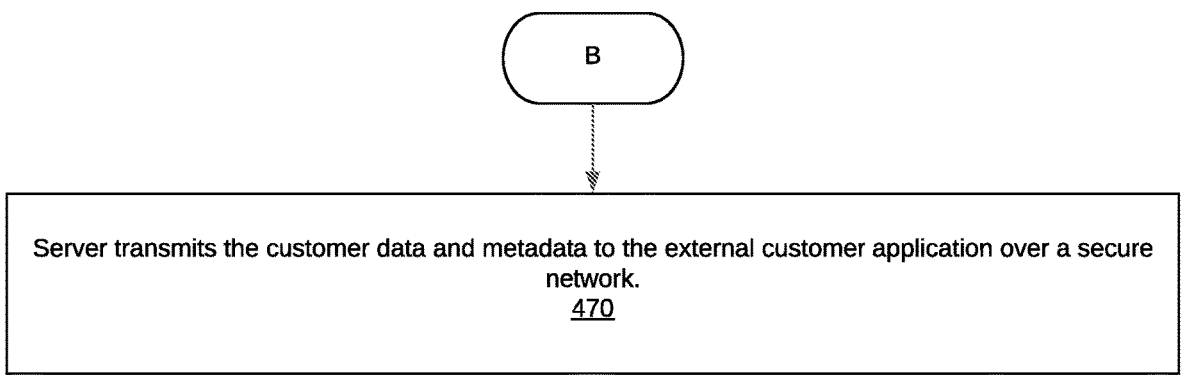

FIGS. 4A-4C illustrate a method for performing a backup and restore with public and private keys. The backup server extracts customer data and metadata from an external customer application (e.g., a cloud-based SaaS application) (step 410). The server processes the customer data and metadata for backup storage (step 415). The server granularly encrypts the customer data and metadata using a public key previously provided by the customer (step 420). The server transmits the granularly-encrypted customer data and metadata over a secure network to a cloud-based data storage system, which stores the customer data and metadata in an encrypted database or file system (step 425).

The server receives a request to restore customer data to the external customer application (step 430). The server retrieves the granularly-encrypted customer data and metadata from the cloud-based data storage system over a secure network (step 435). The server requests a private key to decrypt the customer data and metadata from the customer (step 440). The server receives the private key from the customer (step 445). The server decrypts the granularly-encrypted customer data and metadata using the private key in memory only (step 450). The server discards the private key (step 455). The server processes the decrypted customer data and metadata for a restore to the external customer application (step 460). The server transmits the customer data and metadata to the external customer application over a secure network (step 470).

Figure 5:
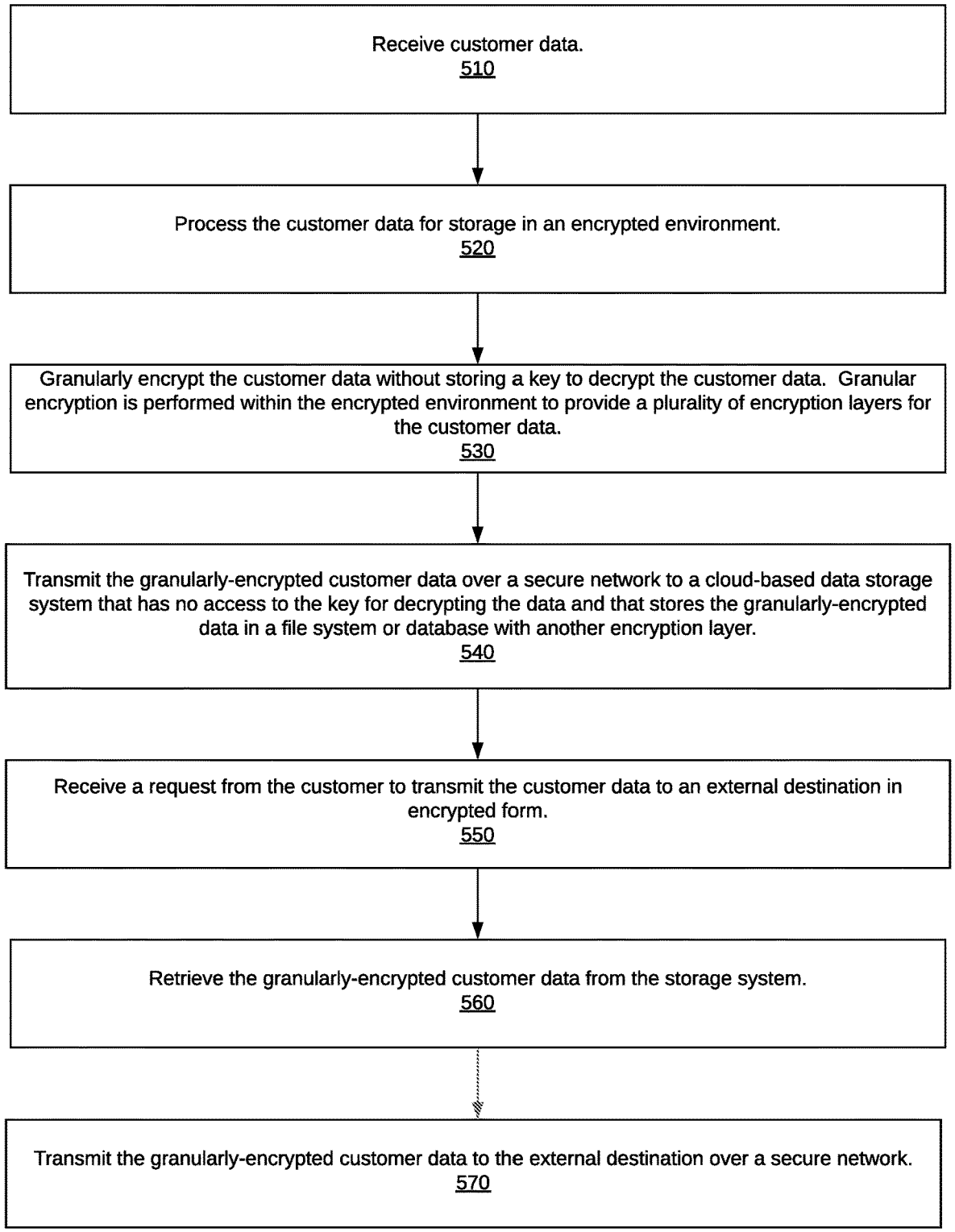
FIG. 5 is a flowchart that illustrates a method, according to an alternate embodiment, for transmitting the granularly-encrypted data to an external destination without decryption.

5. Alternate Embodiment—Method for Transmitting the Granularly-Encrypted Data to an External Destination without Decryption In an alternate embodiment, FIG. 5 illustrates a method for transmitting the granularly-encrypted data to an external destination without decryption. The system receives customer data (step 510). The system processes the customer data for storage in an encrypted environment (step 520). The system granularly encrypts the customer data without storing a key to decrypt the customer data (step 530). Granular encryption is performed within the encrypted environment to provide a plurality of encryption layers for the customer data. The system transmits the granularly-encrypted customer data over a secure network to a cloud-based data storage system that has no access to the key for decrypting the data and that stores the granularly-encrypted data in a file system or database with another encryption layer (step 540). The system receives a request from the customer to transmit the customer data to an external destination in encrypted form (step 550). The system retrieves the granularly-encrypted customer data from the storage system (step 560). The system transmits the granularly-encrypted customer data to the external destination over a secure network (step 570).

6. General

The methods described with respect to FIGS. 1A-5 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for securely handling and storing customer data without enabling human access to the customer data, the method comprising:
   receiving customer data at a server having an encrypted environment ("an encrypted server"), wherein receiving the customer data comprises extracting the customer data from an external customer application over a secure network and wherein the customer data is extracted for the purpose of providing a cloud emulator of the customer data;
   processing the customer data for storage, wherein the processing is performed by a processing module on the encrypted server;
   granularly encrypting the customer data without storing a key for decrypting the customer data, wherein the encryption is performed by an encryption module on the encrypted server;
   transmitting the granularly-encrypted customer data over a secure network to a cloud-based data storage system, wherein the granularly-encrypted customer data is stored in an encrypted database or file system, and wherein the cloud-based data storage system has no access to the key for decrypting the granularly-encrypted customer data,
   wherein granular encryption in the encryption module provides a first encryption layer for the customer data, the encrypted server in which the processing for storage, granular encryption, and decryption take place provides a second encryption layer for the customer data, and storage in the encrypted database or file system provides a third encryption layer for the customer data;
   receiving a request from a customer to transmit the customer data to an external destination;
   retrieving the granularly-encrypted customer data from the cloud-based data storage system over a secure network to the encrypted server;
   receiving at the encrypted server the key for decrypting the granularly-encrypted customer data from the customer or a customer-controlled key management system;
   decrypting the granularly-encrypted customer data using the key, wherein the decryption using the key is performed by a decryption module on the encrypted server;
   discarding the key;
   processing the customer data for transmission, wherein the processing is performed by the processing module on the encrypted server; and
   transmitting the customer data to the external destination over a secure network.

2. The method of claim 1, wherein granularly encrypting the customer data comprises:
   requesting a key for performing granular encryption from a customer-controlled key management system;
   receiving the key from the customer-controlled key management system;
   granularly encrypting the customer data using the key, wherein the key is used by the computer system in memory only; and
   discarding the key after granularly encrypting the customer data.

3. The method of claim 2, wherein decrypting the customer data comprises requesting the key again from the customer-controlled key management system.

4. The method of claim 1, wherein the customer data is encrypted with a public key and decrypted with a private key provided by the customer in response to the customer requesting the customer data be transmitted to the external destination, and wherein the private key is used in memory only for decryption and discarded after decryption.

5. The method of claim 1, wherein:
   the customer data is extracted for the purpose of providing a backup for the customer data in the external customer application;
   processing the customer data for storage comprises processing the customer data for backup; and
   the customer data is retrieved from the cloud-based data storage system, decrypted, and transmitted to the external customer application in response to receiving a restore request from the customer.

6. The method of claim 1, wherein the customer data is extracted for the purpose of archiving the customer data in the external customer application, and processing the customer data for storage comprises processing the customer data for archiving.

7. The method of claim 1, wherein the customer data is extracted for the purpose of providing an alternate storage system.

8. A method performed by a computer system, for securely handling and storing customer data without enabling human access to the customer data, the method comprising:
   receiving customer data at a server having an encrypted environment ("an encrypted server"), wherein receiving the customer data comprises extracting the customer data from an external customer application over a secure network and wherein the customer data is extracted for the purpose of providing a cloud emulator of the customer data;
   processing the customer data for storage, wherein the processing is performed by a processing module on the encrypted server;
   granularly encrypting the customer data without storing a key for decrypting the customer data, wherein the encryption is performed by an encryption module on the encrypted server;
   transmitting the granularly-encrypted customer data over a secure network to a cloud-based data storage system, wherein the granularly-encrypted customer data is stored in an encrypted database or file system, and wherein the cloud-based data storage system has no access to the key for decrypting the granularly-encrypted customer data,
   wherein granular encryption in the encryption module provides a first encryption layer for the customer data, the encrypted server in which the processing for storage, granular encryption, and decryption take place provides a second encryption layer for the customer data, and storage in the encrypted database or file system provides a third encryption layer for the customer data;
   receiving a request from a customer to transmit the customer data to an external destination;
   retrieving the granularly-encrypted customer data from the storage system; and
   transmitting the granularly-encrypted customer data to the external destination over a secure network.

9. The method of claim 8, wherein granularly encrypting the customer data comprises:
   requesting a key for performing granular encryption from a customer-controlled key management system;

receiving the key from the customer-controlled key management system;
granularly encrypting the customer data using the key, wherein the key is used by the computer system in memory only; and
discarding the key after granularly encrypting the customer data.

10. The method of claim 9, wherein decrypting the customer data comprises requesting the key again from the customer-controlled key management system.

11. The method of claim 8, wherein the customer data is encrypted with a public key and decrypted with a private key provided by the customer in response to the customer requesting the customer data be transmitted to the external destination, and wherein the private key is used in memory only for decryption and discarded after decryption.

12. A non-transitory computer-readable medium comprising a computer program, that, when executed by a computer system, enables the computer system to perform the following method for securely handling and storing customer data without enabling human access to the customer data, the method comprising:
  receiving customer data at a server having an encrypted environment ("an encrypted server"), wherein receiving the customer data comprises extracting the customer data from an external customer application over a secure network and wherein the customer data is extracted for the purpose of providing a cloud emulator of the customer data;
  processing the customer data for storage, wherein the processing is performed by a processing module on the encrypted server;
  granularly encrypting the customer data without storing a key for decrypting the customer data, wherein the encryption is performed by an encryption module on the encrypted server;
  transmitting the granularly-encrypted customer data over a secure network to a cloud-based data storage system, wherein the granularly-encrypted customer data is stored in an encrypted database or file system, and wherein the cloud-based data storage system has no access to the key for decrypting the granularly-encrypted customer data,
  wherein granular encryption in the encryption module provides a first encryption layer for the customer data, the encrypted server in which the processing for storage, granular encryption, and decryption take place provides a second encryption layer for the customer data, and storage in the encrypted database or file system provides a third encryption layer for the customer data;
  receiving a request from a customer to transmit the customer data to an external destination;
  retrieving the granularly-encrypted customer data from the cloud-based data storage system over a secure network to the encrypted server;
  receiving at the encrypted server the key for decrypting the granularly-encrypted customer data from the customer or a customer-controlled key management system;
  decrypting the granularly-encrypted customer data using the key, wherein the decryption using the key is performed by a decryption module on the encrypted server;
  discarding the key;
  processing the customer data for transmission, wherein the processing is performed by the processing module on the encrypted server; and
  transmitting the customer data to the external destination over a secure network.

13. The computer-readable medium of claim 12, wherein granularly encrypting the customer data comprises:
  requesting a key for performing granular encryption from a customer-controlled key management system;
  receiving the key from the customer-controlled key management system;
  granularly encrypting the customer data using the key, wherein the key is used by the computer system in memory only; and
  discarding the key after granularly encrypting the customer data.

14. The computer-readable medium of claim 13, wherein decrypting the customer data comprises requesting the key again from the customer-controlled key management system.

15. The computer-readable medium of claim 12, wherein the customer data is encrypted with a public key and decrypted with a private key provided by the customer in response to the customer requesting the customer data be transmitted to the external destination, and wherein the private key is used in memory only for decryption and discarded after decryption.

16. A computer system for securely handling and storing customer data without enabling human access to the customer data, the computer system comprising:
  one or more processors;
  one or more memory units coupled to the one or more processors, wherein the one or more memory units store instructions that, when executed by the one or more processors, cause the computer system to perform the operations of:
    receiving customer data at a server having an encrypted environment ("an encrypted server"), wherein receiving the customer data comprises extracting the customer data from an external customer application over a secure network and wherein the customer data is extracted for the purpose of providing a cloud emulator of the customer data;
    processing the customer data for storage, wherein the processing is performed by a processing module on the encrypted server;
    granularly encrypting the customer data without storing a key for decrypting the customer data, wherein the encryption is performed by an encryption module on the encrypted server;
    transmitting the granularly-encrypted customer data over a secure network to a cloud-based data storage system, wherein the granularly-encrypted customer data is stored in an encrypted database or file system, and wherein the cloud-based data storage system has no access to the key for decrypting the granularly-encrypted customer data,
    wherein granular encryption in the encryption module provides a first encryption layer for the customer data, the encrypted server in which the processing for storage, granular encryption, and decryption take place provides a second encryption layer for the customer data, and storage in the encrypted database or file system provides a third encryption layer for the customer data;

receiving a request from a customer to transmit the customer data to an external destination;

retrieving the granularly-encrypted customer data from the storage system; and transmitting the granularly-encrypted customer data to the external destination over a secure network.

17. The computer system of claim 16, wherein granularly encrypting the customer data comprises:

requesting a key for performing granular encryption from a customer-controlled key management system;

receiving the key from the customer-controlled key management system;

granularly encrypting the customer data using the key, wherein the key is used by the computer system in memory only; and discarding the key after granularly encrypting the customer data.

18. The computer system of claim 17, wherein decrypting the customer data comprises requesting the key again from the customer-controlled key management system.

19. The computer system of claim 16, wherein the customer data is encrypted with a public key and decrypted with a private key provided by the customer in response to the customer requesting the customer data be transmitted to the external destination, and wherein the private key is used in memory only for decryption and discarded after decryption.

* * * * *